(12) United States Patent
Koese et al.

(10) Patent No.: US 10,963,894 B2
(45) Date of Patent: Mar. 30, 2021

(54) FACILITATING AN ERROR ANALYSIS OF A PRODUCT DEFICIENCY SYSTEM AND METHOD

(71) Applicants: Levent Koese, Bendorf (DE); Paul Fletcher, Waterford, MI (US)

(72) Inventors: Levent Koese, Bendorf (DE); Paul Fletcher, Waterford, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 470 days.

(21) Appl. No.: 15/484,351

(22) Filed: Apr. 11, 2017

(65) Prior Publication Data
US 2018/0293597 A1    Oct. 11, 2018

(51) Int. Cl.
*G06F 16/907* (2019.01)
*G06Q 30/02* (2012.01)
(Continued)

(52) U.S. Cl.
CPC ..... *G06Q 30/0201* (2013.01); *G06F 16/2365* (2019.01); *G06F 16/252* (2019.01);
(Continued)

(58) Field of Classification Search
CPC ..... G06F 16/248; G06F 16/907; G06F 16/252
See application file for complete search history.

(56) References Cited

U.S. PATENT DOCUMENTS

2005/0203821 A1* 9/2005 Petersen ............... G06Q 40/06
                                                          705/36 R
2005/0251277 A1* 11/2005 Kuo ...................... G06Q 10/08
                                                          700/110

(Continued)

OTHER PUBLICATIONS

H. Taylor, "An Examination of Decision-Making in It Projects from Rational and Naturalistic Perspectives", 2007 ICIS 2007 Proceedings. (Year: 2007).*

(Continued)

*Primary Examiner* — Sheryl L Holland
(74) *Attorney, Agent, or Firm* — Lempia Summerfield Katz LLC

(57) ABSTRACT

Systems and methods are provided that facilitating an error analysis of a product deficiency. The system may comprise a processor configured to: store lifecycle information related to a lifecycle of the product in a lifecycle database; store manufacturing operations information related to manufacturing operations of the product in a manufacturing operations database; store further lifecycle information related to lifecycle issues and/or non-conformances of the product in the lifecycle database; store further manufacturing operations information related to concerns and/or complaints of the product in the manufacturing operations database; store first reference information related to the further lifecycle information from the lifecycle database in the manufacturing operations database; generate a graphical user interface (GUI) through a display device that enables the manufacturing operations information stored in the manufacturing operations database; and cause the manufacturing operations (Continued)

information, the further manufacturing operations information, and the further lifecycle information to be displayed in the GUI.

23 Claims, 8 Drawing Sheets

(51) Int. Cl.
*G06F 16/25* (2019.01)
*G06F 16/23* (2019.01)
*G06Q 10/06* (2012.01)
*G06Q 10/00* (2012.01)

(52) U.S. Cl.
CPC ........... *G06Q 10/063* (2013.01); *G06Q 10/20* (2013.01); *G06F 16/907* (2019.01); *Y02P 90/80* (2015.11)

(56) References Cited

U.S. PATENT DOCUMENTS

2012/0290342 A1   11/2012  Gower et al.
2016/0110387 A1*  4/2016  Betry ................... G06Q 10/06
                                                          707/731

OTHER PUBLICATIONS

European Search Report for European Patent Application No. 18166708.0-1222 dated Jun. 12, 2018.

* cited by examiner

FACILITATING AN ERROR ANALYSIS OF A PRODUCT DEFICIENCY SYSTEM AND METHOD

TECHNICAL FIELD

The present disclosure is directed, in general, to product lifecycle management (PLM) systems, manufacturing operations management (MOM) systems, quality management systems (QMS) and similar systems, that are used to create, use, and manage data for products and other items (collectively referred to herein as product systems).

BACKGROUND

Data and information related to a product and stored in product systems may suffer from an error that results in a product deficiency. Such product systems may benefit from improvements.

SUMMARY

Variously disclosed embodiments include data processing systems and methods that may be used to facilitate an error analysis of a product deficiency.

In one example, a system for facilitating an error analysis of a product deficiency may include at least one processor configured to store lifecycle information related to a lifecycle of the product in a lifecycle database, the lifecycle information including at least one of conception information, design information, realization information, inspection planning information or any combination thereof; to store manufacturing operations information related to manufacturing operations of the product in a manufacturing operations database, the manufacturing operations information including at least one of production data, product validation data, inspection execution data or any combination thereof; to store further lifecycle information related to lifecycle issues and/or non-conformances of the product in the lifecycle database; to store further manufacturing operations information related to concerns and/or complaints of the product in the manufacturing operations database; to store first reference information related to the further lifecycle information from the lifecycle database in the manufacturing operations database; to generate a graphical user interface (GUI) through a display device that enables the manufacturing operations information stored in the manufacturing operations database, the further manufacturing operations information stored in the manufacturing operations database and the further lifecycle information stored in the lifecycle database using the first reference information stored in the manufacturing operations database to be displayable in the GUI; to cause the manufacturing operations information stored in the manufacturing operations database, the further manufacturing operations information stored in the manufacturing operations database and the further lifecycle information stored in the lifecycle database using the first reference information stored in the manufacturing operations database to be displayed in the GUI.

In another example, a system for facilitating an error analysis of a product deficiency may include at least one processor configured to store lifecycle information related to a lifecycle of the product in a lifecycle database, the lifecycle information including at least one of conception information, design information, realization information, inspection planning information or any combination thereof; to store manufacturing operations information related to manufacturing operations of the product in a manufacturing operations database, the manufacturing operations information including at least one of production data, product validation data, inspection execution data or any combination thereof; to store further lifecycle information related to lifecycle issues and/or non-conformances of the product in the lifecycle database; to store further manufacturing operations information related to concerns and/or complaints of the product in the manufacturing operations database; to store third reference information related to the further manufacturing operations information from the manufacturing operations database in the lifecycle database; to generate a graphical user interface (GUI) through a display device that enables the lifecycle information stored in the lifecycle database, the further lifecycle information stored in the lifecycle database and the further manufacturing operations information stored in the manufacturing operations database using the third reference information stored in the lifecycle database to be displayable in the GUI; to cause the lifecycle information stored in the lifecycle database, the further lifecycle information stored in the lifecycle database and the further manufacturing operations information stored in the manufacturing operations database using the third reference information stored in the lifecycle database to be displayed in the GUI.

Those skilled in the art will appreciate that they may readily combine the two above mentioned systems for facilitating an error analysis of a product deficiency.

In another example, a method for facilitating an error analysis of a product deficiency may include through operation of at least one processor an act of storing lifecycle information related to a lifecycle of the product in a lifecycle database, the lifecycle information including at least one of conception information, design information, realization information, inspection planning information or any combination thereof; an act of storing manufacturing operations information related to manufacturing operations of the product in a manufacturing operations database, the manufacturing operations information including at least one of production data, product validation data, inspection execution data or any combination thereof; an act of storing further lifecycle information related to lifecycle issues and/or non-conformances of the product in the lifecycle database; an act of storing further manufacturing operations information related to concerns and/or complaints of the product in the manufacturing operations database; an act of storing first reference information related to the further lifecycle information from the lifecycle database in the manufacturing operations database; an act of generating a graphical user interface (GUI) through a display device that enables the manufacturing operations information stored in the manufacturing operations database, the further manufacturing operations information stored in the manufacturing operations database and the further lifecycle information stored in the lifecycle database using the first reference information stored in the manufacturing operations database to be displayable in the GUI; an act of causing the manufacturing operations information stored in the manufacturing operations database, the further manufacturing operations information stored in the manufacturing operations database and the further lifecycle information stored in the lifecycle database using the first reference information stored in the manufacturing operations database to be displayed in the GUI.

In another example, a method for facilitating an error analysis of a product deficiency may include through operation of at least one processor an act of storing lifecycle information related to a lifecycle of the product in a lifecycle database, the lifecycle information including at least one of conception information, design information, realization information, inspection planning information or any combination thereof; an act of storing manufacturing operations information related to manufacturing operations of the product in a manufacturing operations database, the manufacturing operations information including at least one of production data, product validation data, inspection execution data or any combination thereof; an act of storing further lifecycle information related to lifecycle issues and/or non-conformances of the product in the lifecycle database; an act of storing further manufacturing operations information related to concerns and/or complaints of the product in the manufacturing operations database; an act of storing third reference information related to the further manufacturing operations information from the manufacturing operations database in the lifecycle database; an act of generating a graphical user interface (GUI) through a display device that enables the lifecycle information stored in the lifecycle database, the further lifecycle information stored in the lifecycle database and the further manufacturing operations information stored in the manufacturing operations database using the third reference information stored in the lifecycle database to be displayable in the GUI; an act of causing the lifecycle information stored in the lifecycle database, the further lifecycle information stored in the lifecycle database and the further manufacturing operations information stored in the manufacturing operations database using the third reference information stored in the lifecycle database to be displayed in the GUI.

Those skilled in the art will appreciate that they may readily combine the two above mentioned methods for facilitating an error analysis of a product deficiency.

A further example may include non-transitory computer readable medium encoded with executable instructions (such as a software component on a storage device) that when executed, causes at least one processor to carry out at least one of the two described methods.

Those skilled in the art will appreciate that a product deficiency may by way of example be embodied by a product fault, a product problem, a fault in the manufacturing process of the product, a problem in the manufacturing process of the product or any combination thereof.

Those skilled in the art will appreciate that the further lifecycle information may by way of example include at least one of design issues, simulation issues, ergonomics analysis issues, dimensional analysis issues, related lifecycle issues, complaints, faults, problems or any combination thereof.

Those skilled in the art will appreciate that the further manufacturing operations information may by way of example include at least one of customer complaints, in-process complaints, outgoing-goods complaints, supplier complaints, related manufacturing complaints, issues, faults, problems or any combination thereof.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
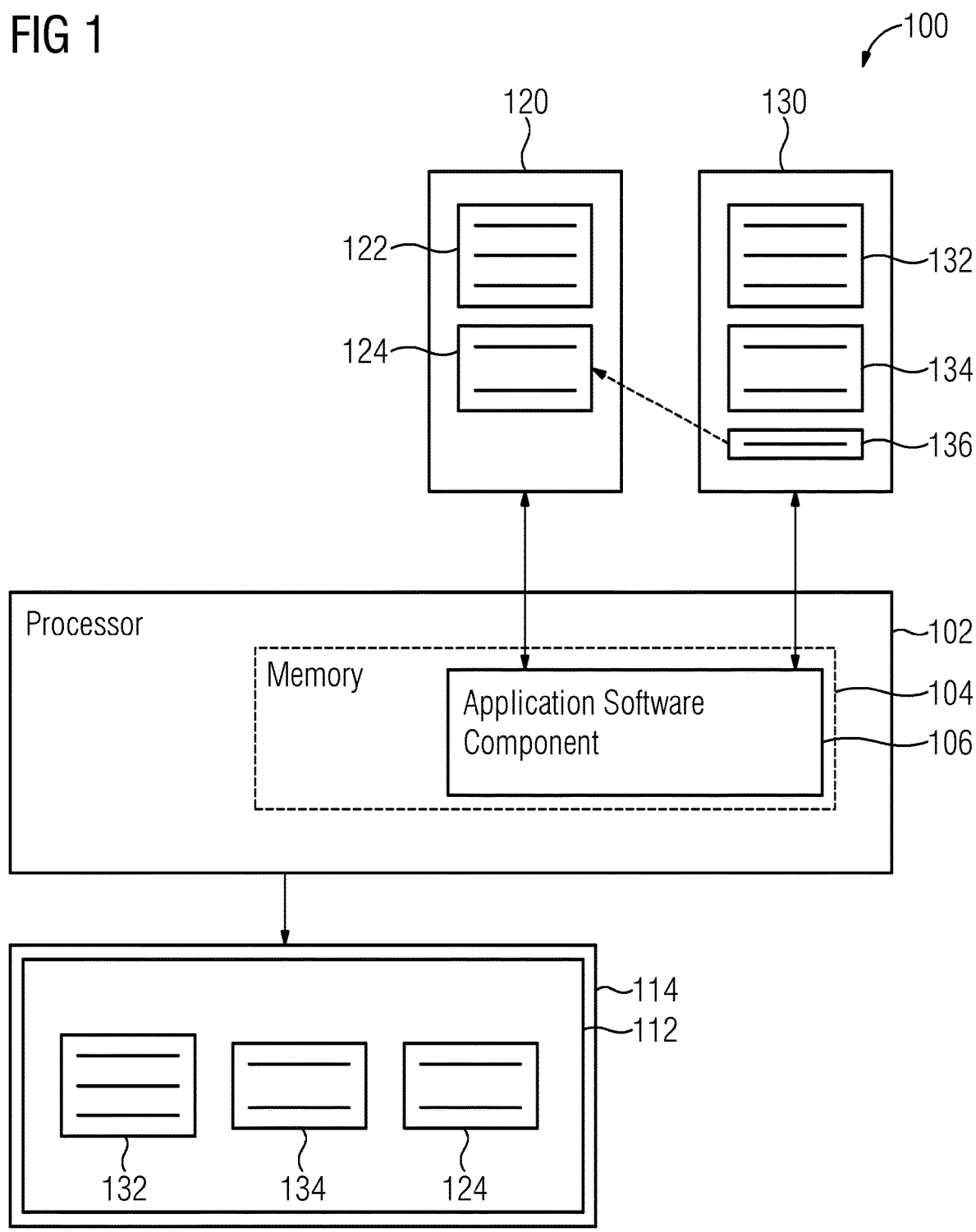
FIG. 1 illustrates a functional block diagram of an example system that facilitates an error analysis of a product deficiency in a product system.

Various technologies that pertain to systems and methods for facilitating an error analysis of a product deficiency in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates an error analysis of a product deficiency. The product deficiency may by way of example be embodied by a product fault, a product problem, a fault in the manufacturing process of the product, a problem in the manufacturing process of the product or any combination thereof. The processing system 100 may include at least one processor 102 that is configured to execute at least one application software component 106 from a memory 104 accessed by the processor 102. The application software component 106 may be configured (e.g., programmed) to cause the processor 102 to carry out various acts and functions described herein. For example, the described application software component 106 may include and/or correspond to one or more components of PLM, MOM or QMS software application that is configured to generate and store product data in data stores 120 and 130 such as a database, respectively.

Examples of PLM systems that may be configured to include the facilitation features of an error analysis of a product deficiency described herein may include the Active Workspace features of Teamcenter, the NX suite of applications, Solid Edge, and/or LMS Imagine. LAB applications, all of which applications are produced by Siemens Product Lifecycle Management Software Inc., of Plano Tex. Examples of MOM systems that may be configured to include the facilitation features of an error analysis of a product deficiency described herein may include the features of Manufacturing Execution System (MES), SCADA, SIMATIC IT, SIMATIC WinCC, all of which applications are produced by Siemens AG, of Munich, Germany or its subsidiaries. Examples of MOM systems that may be configured to include the facilitation features of an error analysis of a product deficiency described herein may include the features of IBS QMS, produced by Siemens Industry Software GmbH, of Cologne, Germany. However, it should be appreciated that the systems and methods described herein may be used in other product systems (e.g., PDM, application lifecycle management (ALM) systems) and/or any other type of system that generates and stores product data in a database. Also, examples of databases that may be used as one or more data stores described herein include database server applications such as Oracle, Microsoft SQL Server, or any other type of data store that is operative to store data records. Further, it should be appreciated that the manufacturing operations management system is intended for the manufacturing of the product, which is by way of example a tangible hardware product.

It should be appreciated that it can be difficult and time-consuming to carry out an error analysis of a product deficiency. For example, there may be a large number of potential error sources and complex interrelations.

To enable the enhanced error analysis of a product deficiency, the described processing system 100 may include at least one display device 112 (such as a display screen), whereby the described processor 102 may be configured to generate a GUI 114 through the display device 112. Such a GUI may include GUI elements such as buttons, links, search boxes, lists, text boxes, images, scroll bars) usable by a user.

In an example embodiment, the application software component 106 and/or the processor 102 may be configured to store lifecycle information 122 related to a lifecycle of the product in a lifecycle database 120, the lifecycle information 122 including at least one of conception information, design information, e.g. computer-aided design (CAD) data, realization information, e.g. data related to production planning from Teamcenter, inspection planning information or any combination thereof. By way of example, the lifecycle information 122 may additionally include service planning information which may be drawn up before a manufacturing process.

For the facilitation of the error analysis the application software component 106 and/or the processor 102 may be configured to store manufacturing operations information 132 related to manufacturing operations of the product in a manufacturing operations database 130, the manufacturing operations information 132 including at least one of production data, e.g. dimensions of the product, product validation data, inspection execution data or any combination thereof.

Furthermore, the application software component 106 and/or the processor 102 may be configured to store further lifecycle information 124 related to lifecycle issues and/or non-conformances of the product in the lifecycle database 120, the further lifecycle information 124 by way of example including at least one of design issues, simulation issues, ergonomics analysis issues, dimensional analysis issues, related lifecycle issues, complaints, faults, problems or any combination thereof. The application software component 106 and/or the processor 102 may further be configured to store further manufacturing operations information 134 related to concerns and/or complaints of the product in the manufacturing operations database 130, the further manufacturing operations information 134 by way of example including at least one of customer complaints, in-process complaints, e.g. if inspection execution data deviates from expected data which may be found out using statistical process control, outgoing-goods complaints, e.g. indication whether the product has correctly been manufactured, supplier complaints, which relate to an evaluation of parts used for manufacturing the product but delivered beforehand from a supplier, related manufacturing complaints, issues, faults, problems or any combination thereof.

In order to carry out the enhanced error analysis of a product deficiency the application software component 106 and/or the processor 102 may be configured to store first reference information 136 related to the further lifecycle information 124 from the lifecycle database 120 in the manufacturing operations database 130. The application software component 106 and/or the processor 102 may further be configured to generate a graphical user interface (GUI) 114 through a display device 112 that enables the manufacturing operations information 132 stored in the manufacturing operations database 130, the further manufacturing operations information 134 stored in the manufacturing operations database 130 and the further lifecycle information 124 stored in the lifecycle database 120 using the first reference information 136 stored in the manufacturing operations database 130 to be displayable in the GUI 114. Additionally, the application software component 106 and/or the processor 102 may be configured to cause the manufacturing operations information 132 stored in the manufacturing operations database 130, the further manufacturing operations information 134 stored in the manufacturing operations database 130 and the further lifecycle information 124 stored in the lifecycle database 120 using the first reference information 136 stored in the manufacturing operations database 130 to be displayed in the GUI 114.

The described examples may provide an efficient way for users to facilitate an error analysis of a product deficiency by providing a centralized approach according to which data both from the PLM system and the MOM/QMS system are accessed and assessed. This may allow for an enhanced error analysis and in particular for a root cause analysis which helps to identify an error and an error root cause which is the origin of a product deficiency.

Consequently, the suggested facilitation of an error analysis of a product deficiency is of advantage compared to another approach according to which PLM information is and remains separated from MOM information during an error analysis. In this approach non-conformance management may exist for physical parts, e.g. in a QMS concern and complaint management module, and separately for digital parts, e.g. in a Teamcenter issue management and corrective action preventive action (CAPA) module. Here, the digital part and the physical parts are separate areas and the non-conformance data is not collected at the same place. Consequently, in this approach if any issues that came up on the digital part, e.g. at the ideation phase, these issues are evaluated separately from the complaints on the produced physical part.

In contrast to this other approach, the suggested facilitation of an error analysis of a product deficiency provides for accessing to the data of both areas, e.g., of the physical part through the MOM/QMS information and the digital part through the PLM information, in one module which allows a deeper error analysis, in particular a deeper root cause analysis within the non-conformance management or MOM/QMS process. Therefore, users of both areas, PLM and MOM/QMS, may now be involved in both areas and each other's domains to work on the error analysis and in particular the root cause analysis. For example, the suggested analysis may take design variants into account. Therefore, the process is now made easier, faster, and more efficient.

By way of example, the suggested enhancement may be explained in the framework of the Siemens PLM, MOM and QMS portfolio. To accomplish the suggested solution the two modules, namely Issue Management and CAPA ("corrective action preventive action") and Concern and Complaint Management, will be integrated and leverage each other's functionalities. The combination of different concepts makes it possible to achieve the benefits mentioned above and below.

The issue creation will happen still in the native environment of the user. The Issue Management and CAPA application are running on active workspace and the capability of active workspace to run embedded in any PLM product makes it possible to create non-conformances in any PLM product. These non-conformances in the PLM environment will be also created in the MOM database and linked to each other, e.g. via linked data framework. Users from the respective area can track the non-conformance process in their own environment, provided they have corresponding access rights.

A common action management will make it possible to involve engineers that are in the PLM environment into the overall root cause analysis process including data from both areas. A PLM-ERP (enterprise resource planning) parts concept will make it possible to allocate complained physical parts to their digital twin in the PLM environment, so that a shop floor complaint leads an engineer directly to the design part for the issue resolution process. The overall view of collected data from both areas will enable an enhanced error analysis and in particular a deep root cause analysis, where complaints of the physical part and the digital twin can be evaluated at the same time to identify complex relations between them with taking care of the configuration of the bill of materials and product variants.

The suggested solution exposes all available non-conformance correlations and even creates the capability to discover complex relations between the PLM and the MOM/QMS environment for a root cause analysis, by providing the continuity of the product lifecycle regarding non-conformances. The digital thread enables to gather the non-conformances from all lifecycle stages from design, manufacturing planning, execution and customer use of a part. Different variants or configured products can be analyzed. This improves the quality of the product and/or the process, so that failures do not reappear and unplanned costs are reduced. It improves the collaboration within a company by establishing a better feedback of failure information to the design responsible.

For example, the user makes a root cause analysis on a part related failure, e.g. a broken cross beam, that was a non-conformance notification that came from a customer. For a root cause analysis, the more background the user has, the better he can find correlations. He can access the non-conformance data for this related part over the complete lifecycle and discovers that there was an "ergonomic analysis issue" during the design phase where the cross beam form was changed, but the simulation was not repeated after that change. Then the design engineer gets a change request to revise the crossbeam with the ergonomic analysis issue and the customer non-conformance of a broken cross beam. With this information he can design a change that avoids both issues.

In another example, non-conformances concerning a produced physical part with serial numbers can be allocated directly to a design part on the PLM environment with a PLM-ERP part alignment concept. An error analysis can be done by considering non-conformances of PLM and MOM/QMS environments in regards of product variants and part revisions.

By way of example, the first reference information 136 includes at least a link from the manufacturing operations database 130 to the further lifecycle information 124 stored in the lifecycle database 120. In another example, the first reference information 136 may include the further lifecycle information 124 stored in the lifecycle database 120 which has been duplicated and copied into the manufacturing operations database 130.

Figure 2:
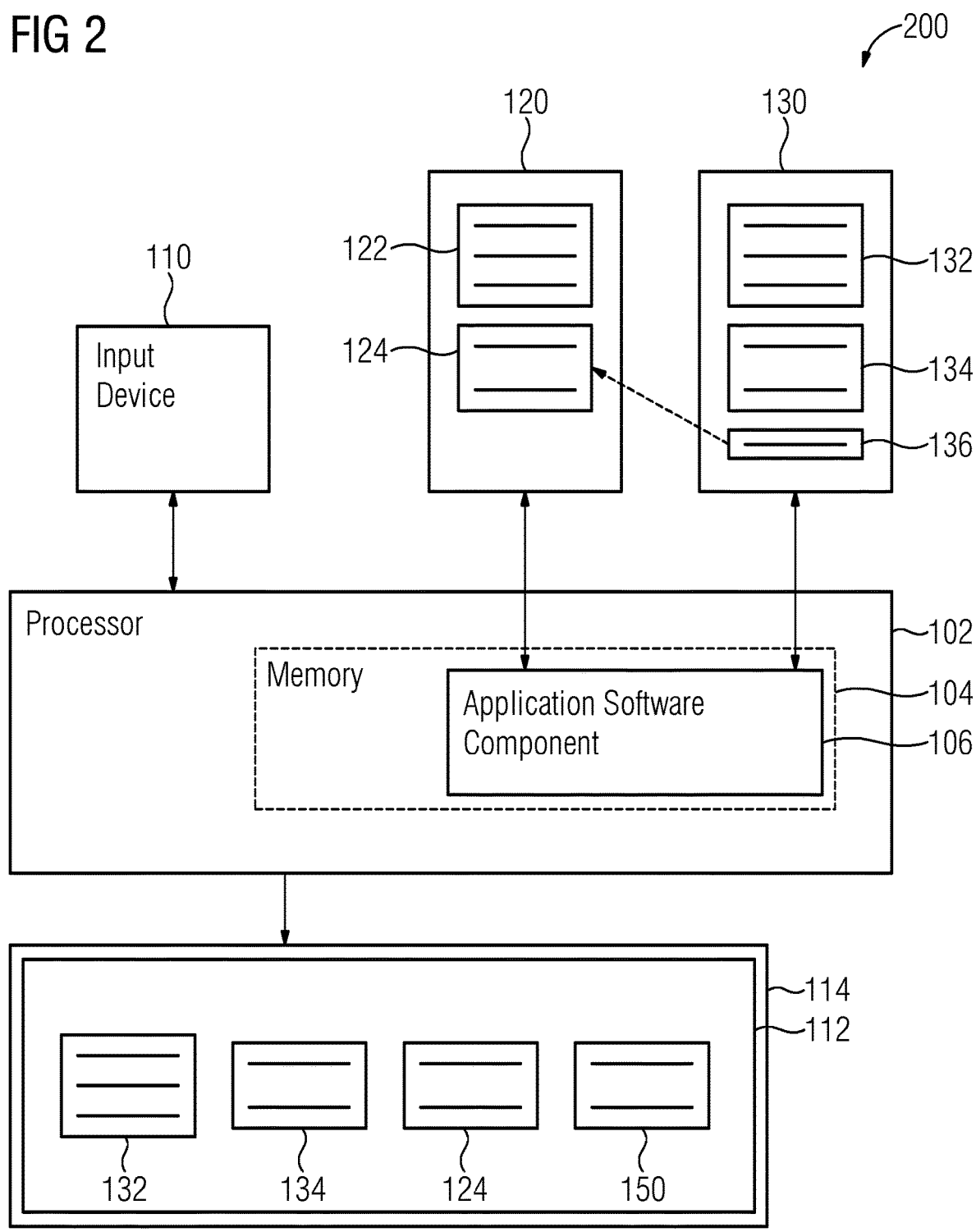
FIGS. 2 to 6 illustrate a functional block diagram of other example systems that facilitate an error analysis of a product deficiency in a product system, respectively.

With reference to FIG. 2, another example data processing system 200 is illustrated that facilitates an error analysis of a product deficiency. Comparing the present example data processing system 200 with the example data processing system 100 illustrated in FIG. 1, the present application software component 106 and/or the processor 102 may further be configured to receive at least one first input through an input device 110, the at least one first input corresponding to a query related to the manufacturing operations information 132, to the further manufacturing operations information 134 and to the further lifecycle information 124. Further, the application software component 106 and/or the processor 102 may be configured to input the manufacturing operations information 132 stored in the manufacturing operations database 130, the further manufacturing operations information 134 stored in the manufacturing operations database 130 and the further lifecycle information 124 stored in the lifecycle database 120 using the first reference information 136 stored in the manufacturing operations database 130 to an information retrieval algorithm. The application software component 106 and/or the processor 102 may then be configured to determine information 150 relevant to the query using the information retrieval algorithm, to generate a GUI 114 through the display device 112 that enables the determined information 150 relevant to the query to be displayable in the GUI 114 and to cause the determined information 150 relevant to the query to be displayed in the GUI 114.

In the framework of this example, the query or several queries may be provided which correspond to predefined problems or questions. By way of example, such problems or questions may be thought of beforehand by considering potential errors and their consequences or afterwards by examining real product deficiencies. The mentioned query may be related to such kinds of problems or questions such that the determined information relevant to the query using the information retrieval algorithm may reveal data pointing towards the underlying error.

An example query may be directed to different variants of a product, e.g. a car including sedan, SUV, cabriolet and station wagon variants with different engine variants and comfort variants, whereby one of the variants suffers from a problem, e.g. a relatively high number of defect blinking lights. The information relevant to the query may include data related to the problematic product feature for the different variants, including electrical and mechanical interfaces to the rest of the car. This information relevant to the query will then be displayed in the GUI so that an engineer may, for example, recognize that for the problematic product variant an interface of the rest of the car towards the blinking lights has been amended, however, the blinking lights are still the same for all different variants. The engineer may then come to the conclusion that an adaptation of the interface of the blinking lights towards the rest of the car has been omitted for the problematic variant which may constitute the source of the error.

By way of example, a query may be directed to different revisions of a product design which has been developed from the raw design to intermediate design versions to a final design. An error may, for example, occur if a design improvement in one of the intermediate design versions has not been taken over to the final design. The information relevant to the query may include data related to the problematic product feature for the different design versions. This information relevant to the query will then be displayed in the GUI so that an engineer may, for example, recognize that the design improvement has not been taken over to the final design and that this may constitute the source of the error.

It should also be appreciated that in a related example, the application software component 106 and/or the processor 102 may further be configured to store the determined information 150 relevant to the query in the manufacturing operations database 130.

Figure 3:
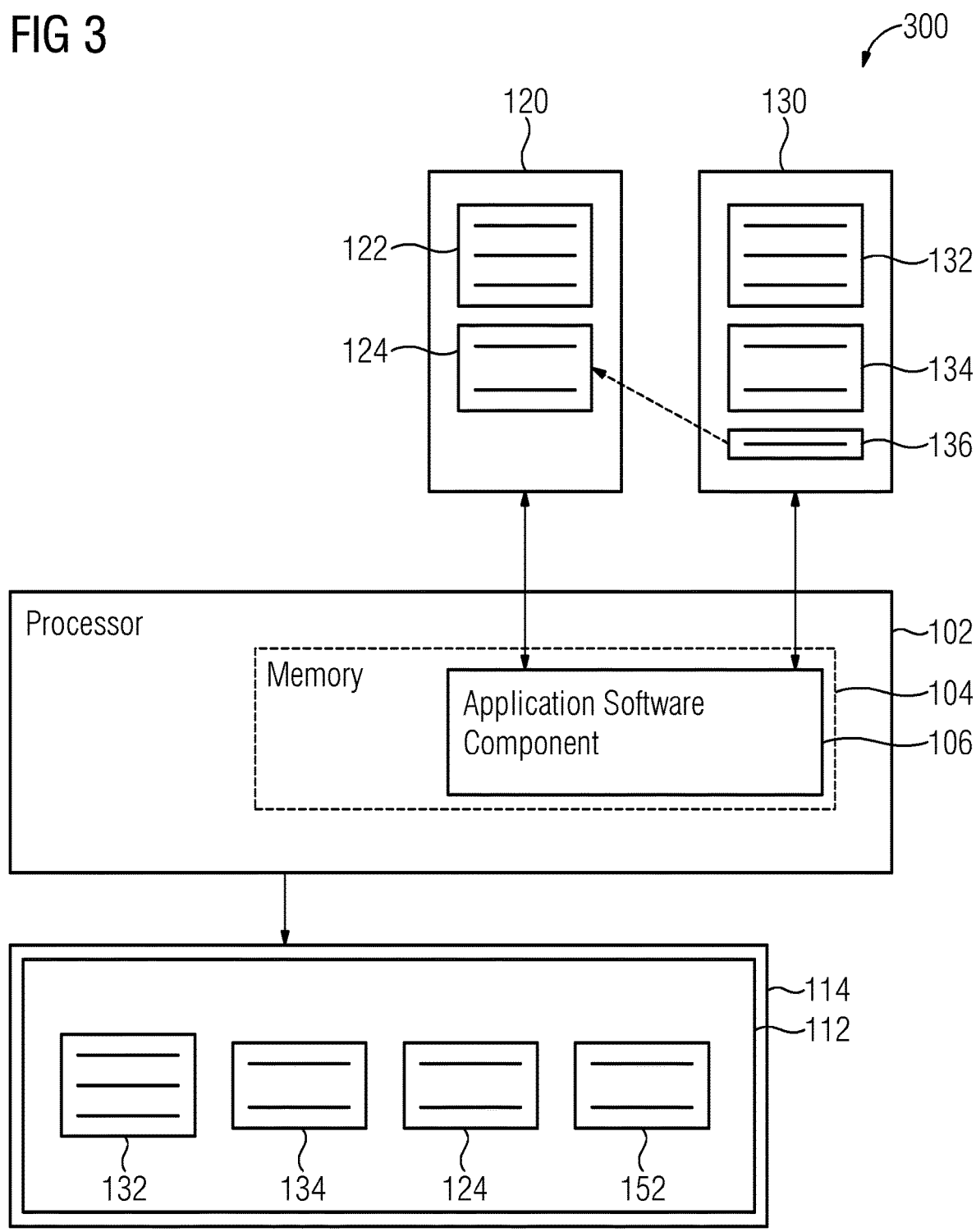

With reference to FIG. 3, a further example data processing system 300 is illustrated that facilitates an error analysis of a product deficiency. Comparing the present example data processing system 300 with the example data processing system 100 illustrated in FIG. 1, the present application software component 106 and/or the processor 102 may further be configured to input the manufacturing operations information 132 stored in the manufacturing operations database 130, the further manufacturing operations information 134 stored in the manufacturing operations database 130 and the further lifecycle information 124 stored in the lifecycle database 120 using the first reference information 136 stored in the manufacturing operations database 130 to an error analysis algorithm. The application software component 106 and/or the processor 102 may further be configured to determine error information 152 related to the product deficiency using the error analysis algorithm, to generate a GUI 114 through the display device 112 that enables the determined error information 152 to be displayable in the GUI 114 and to cause the determined error information 152 to be displayed in the GUI 114.

In this example, the error analysis may be carried out automatically by inputting the mentioned data and information to the error analysis algorithm which then determines error information 152 related to the product deficiency. This determined error information 152 will then be displayed. By way of example, the determined error information 152 may already include the source of the error or even information how to prevent the error to occur in future products yet to be produced.

An example error analysis algorithm may be directed to reveal inconsistencies between different variants of a product. For the above mentioned example of a car including sedan, SUV, cabriolet and station wagon variants with different engines variants and comfort variants, such an error analysis algorithm may automatically recognize that an adaptation of the interface of the blinking lights towards the rest of the car has been omitted for the problematic variant and that this omission may constitute the source of the error. By way of example, the error analysis algorithm may include information to prevent the error to reoccur, e.g. by indicating that the adaptation of the interface of the blinking lights needs to be included for the problematic variant as well and e.g. by providing corresponding amended lifecycle information and/or manufacturing operations information.

Another example of an error analysis algorithm may be directed to reveal inconsistencies between different revisions of a product design which has been developed from the raw design to intermediate design versions to a final design. For the above mentioned example of a design improvement in one of the intermediate design versions, whereby the design improvement has not been taken over to the final design the error analysis algorithm may automatically recognize that the design improvement has not been taken over to the final design and that this may constitute the source of the error. By way of example, the error analysis algorithm may include information to prevent the error to reoccur, e.g. by indicating that the improvement needs to be included in the final design as well and e.g. by providing corresponding amended lifecycle information and/or manufacturing operations information.

Figure 4:
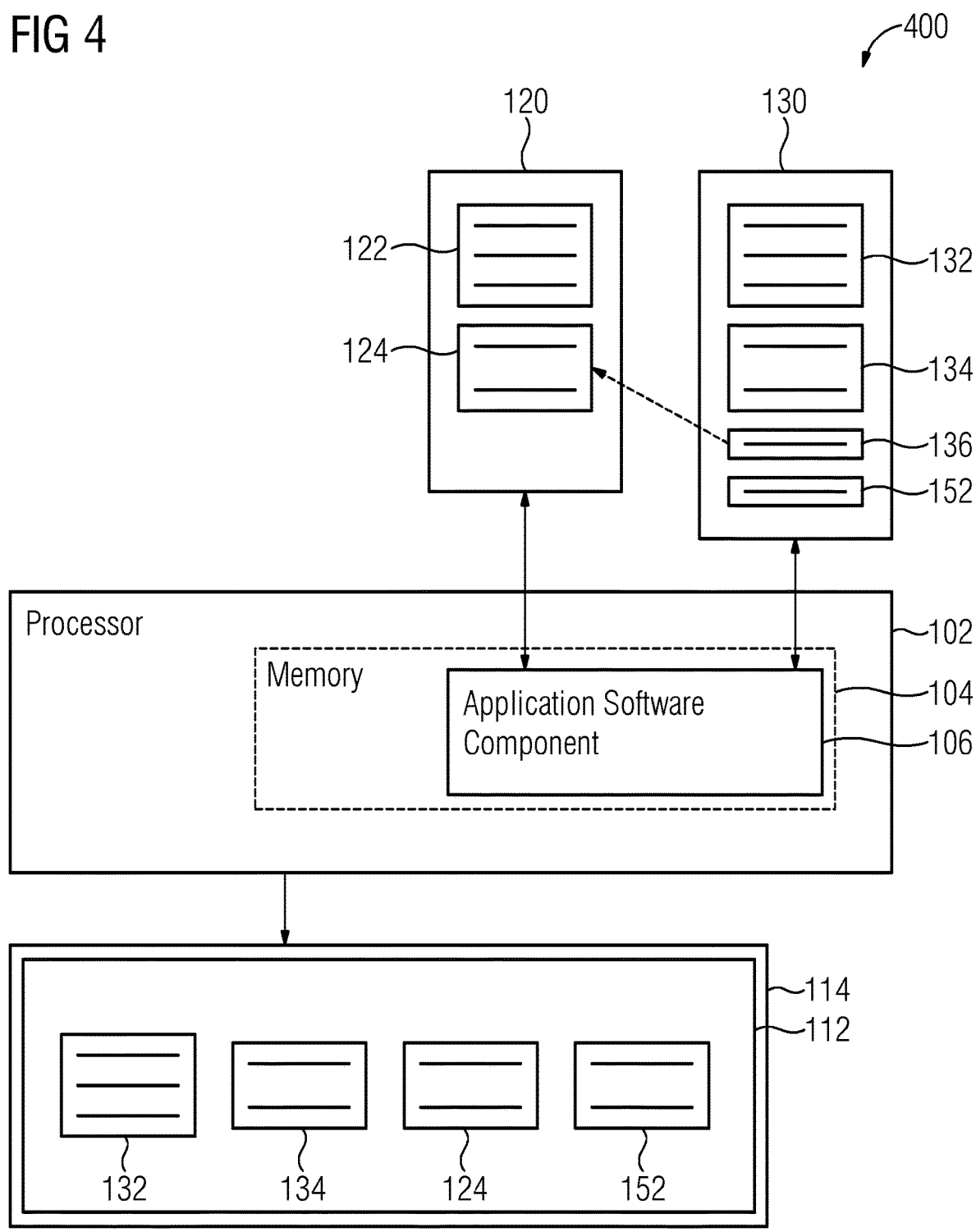

With reference to FIG. 4, a further example data processing system 400 is illustrated that facilitates an error analysis of a product deficiency. Comparing the present example data processing system 400 with the example data processing system 300 illustrated in FIG. 3, the present application software component 106 and/or the processor 102 may further be configured to store the determined error information 152 related to the product deficiency in the manufacturing operations database 130.

It should also be appreciated that in other examples, the application software component 106 and/or the processor 102 may further be configured to store second reference information related to the determined error information 152 from the manufacturing operations database 130 in the lifecycle database 120.

In further examples, the second reference information includes at least a link from the lifecycle database 120 to the determined error information 152 stored in the manufacturing operations database 130.

Figure 5:
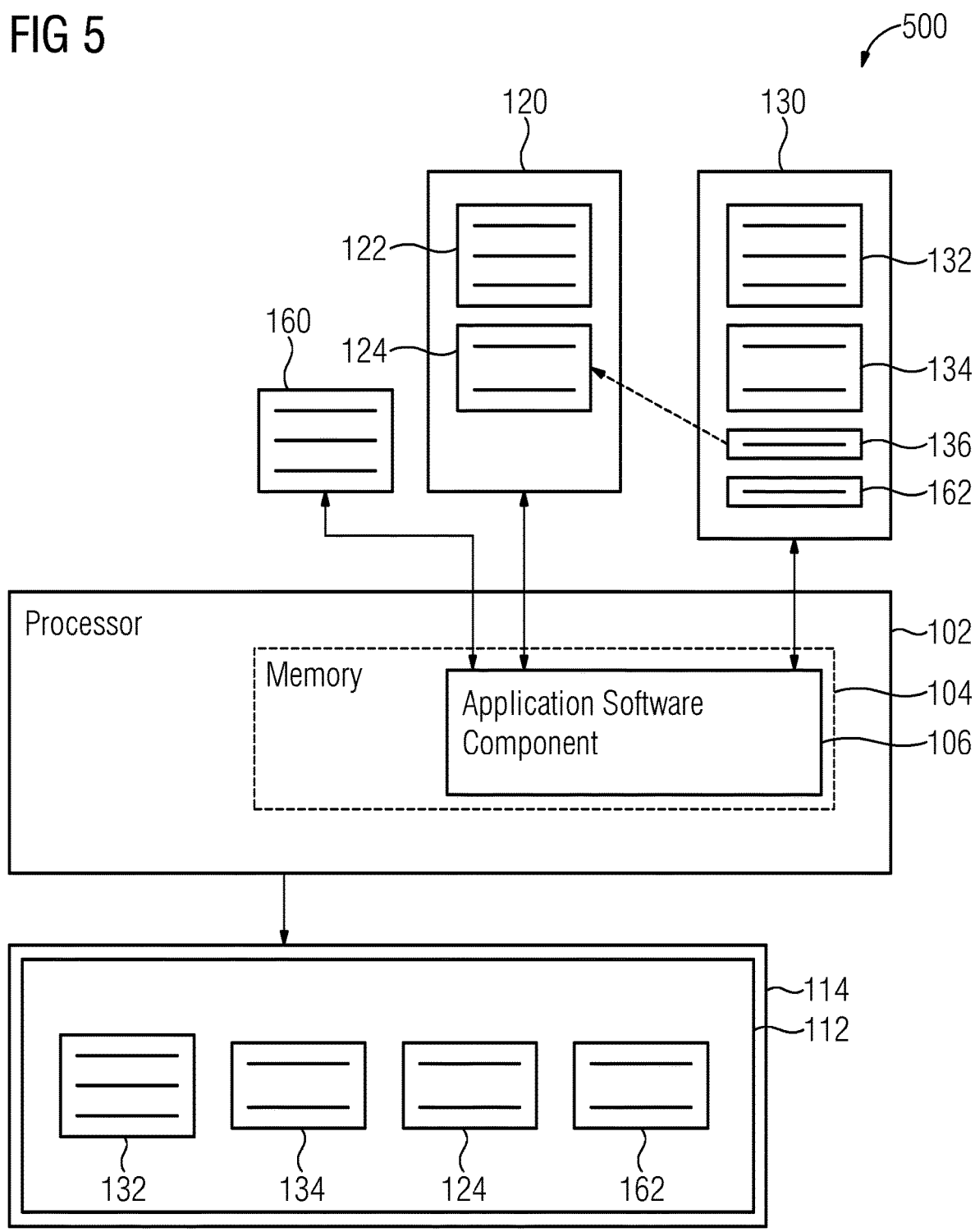

With reference to FIG. 5, a further example data processing system 500 is illustrated that facilitates an error analysis of a product deficiency. Comparing the present example data processing system 500 with the example data processing system 300 illustrated in FIG. 3, the present application software component 106 and/or the processor 102 may further be configured to provide a table 160 linking at least one predefined error pattern to action information relating to at least one error reduction action, the at least one error reduction action reducing or avoiding the product deficiency related to the determined error information 152. The application software component 106 and/or the processor 102 may further be configured to assign the determined error information 152 to one of the at least one predefined error pattern and to determine action information 162 using the table and the assigned at least one predefined error pattern. The application software component 106 and/or the processor 102 may further be configured to generate a GUI 114 through the display device 112 that enables the determined action information 162 to be displayable in the GUI 114 and to cause the determined action information 162 to be displayed in the GUI 114. In this example, the determined error information 152 may or may not be displayed in the GUI and/or stored in the manufacturing operations database 130.

In the present example, the error analysis may automatically be carried out and measures in order to avoid the identified error reoccur are suggested and displayed to a user. The user may then review the suggested action information 162 in the light of the available information and documentation including the manufacturing operations information 132, the further manufacturing operations information 134 and the further the lifecycle information 124. By way of example, the user may additionally take the determined error information 152 into consideration. Reviewing all the information, the user may then decide whether the determined action information 162 shall be implemented in the manufacturing of the products. To this end, an input device as mentioned above may be provided and the corresponding selection may use as a second input and be displayed to the user using a corresponding GUI 114 displayed in the display device 112.

It should also be appreciated that in other examples, the application software component 106 and/or the processor 102 may further be configured to store the determined action information 162 in the manufacturing operations database 130 and to amend manufacturing operations, in particular manufacturing operations information 132, according to the determined action information 162.

Accordingly, the determined action information 162 will automatically be implemented in the manufacturing of the products so that based on the manufacturing operations information 132, the further manufacturing operations information 134 and the further the lifecycle information 124 a fully automated error recognition and handling method and system may be provided. This method and system allow for automatically determining error information 152 and related action information 162. The determined action information 162 may then be input to the manufacturing operations database 130 and may be used to amend the manufacturing operations information 132 so that products may subsequently be manufactured according to the amended manufacturing operations information and the error is prevented from reoccurring. By way of example, the lifecycle information 122 may be updated accordingly, in order to reflect the made amendments.

Figure 6:
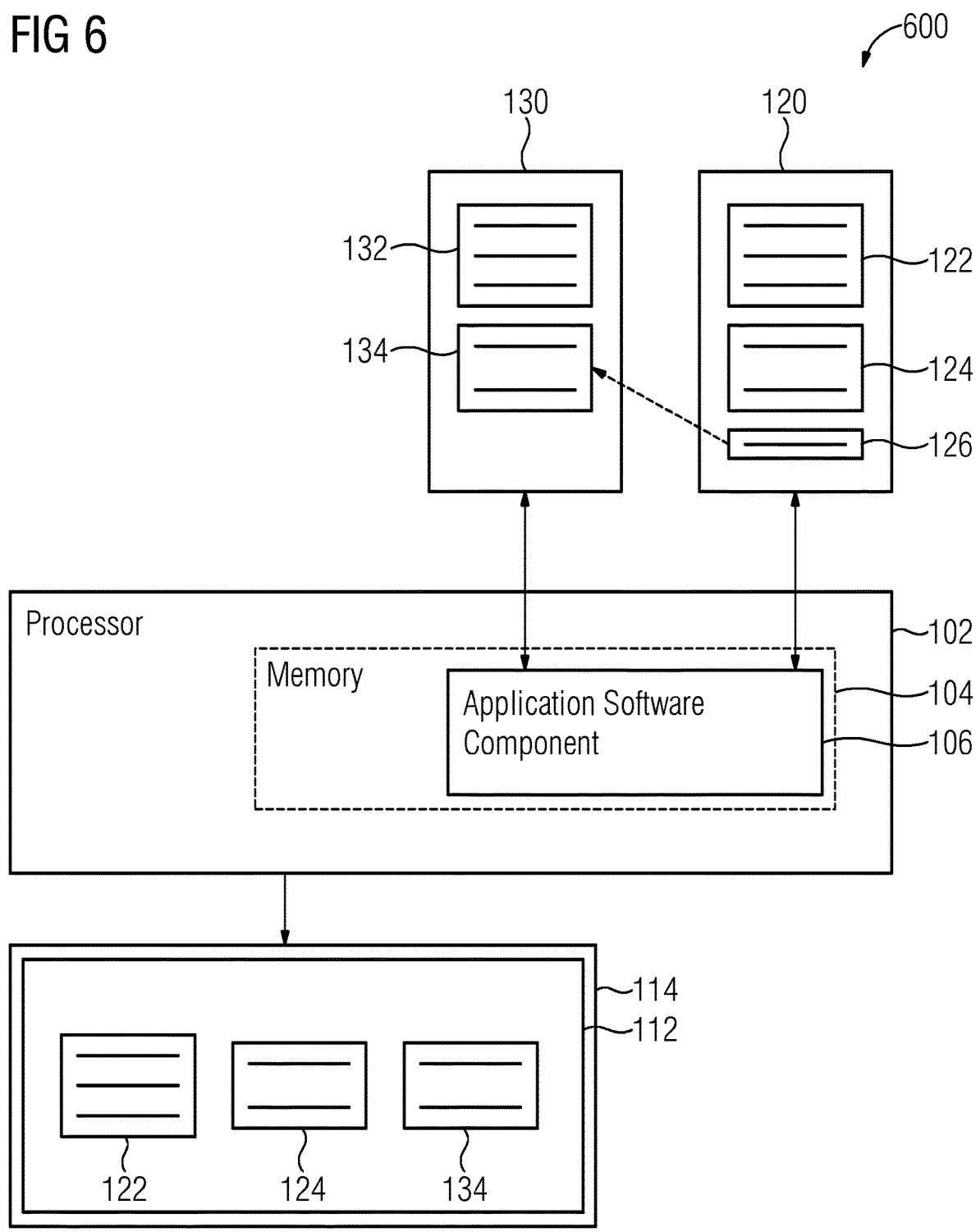

With reference to FIG. 6, another example data processing system 600 is illustrated that facilitates an error analysis of a product deficiency. The product deficiency may by way of example be embodied by a product fault, a product problem, a fault in the manufacturing process of the product, a problem in the manufacturing process of the product or any combination thereof. The application software component 106 and/or the processor 102 may be configured to store lifecycle information 122 related to a lifecycle of the product in a lifecycle database 120, the lifecycle information 122 including at least one of conception information, design information, realization information, inspection planning information or any combination thereof. The application software component 106 and/or the processor 102 may further be configured to store manufacturing operations information 132 related to manufacturing operations of the product in a manufacturing operations database 130, the manufacturing operations 132 information including at least one of production data, product validation data, inspection execution data or any combination thereof. The application software component 106 and/or the processor 102 may further be configured to store further lifecycle information 124 related to lifecycle issues and/or non-conformances of the product in the lifecycle database 120, the further lifecycle information 124 by way of example including at least one of design issues, simulation issues, ergonomics analysis issues, dimensional analysis issues, related lifecycle issues, complaints, faults, problems or any combination thereof. The application software component 106 and/or the processor 102 may further be configured to store further manufacturing operations information 134 related to concerns and/or complaints of the product in the manufacturing operations database 130, the further manufacturing operations information 134 by way of example including at least one of customer complaints, in-process complaints, outgoing-goods complaints, supplier complaints, related manufacturing complaints, issues, faults, problems or any combination thereof. The application software component 106 and/or the processor 102 may further be configured to store third reference information 126 related to the further manufacturing operations information 134 from the manufacturing operations database 130 in the lifecycle database 120. The application software component 106 and/or the processor 102 may further be configured to generate a GUI 114 through a display device 112 that enables the lifecycle information 122 stored in the lifecycle database 120, the further lifecycle information 124 stored in the lifecycle database 120 and the further manufacturing operations information 134 stored in the manufacturing operations database 130 using the third reference information 126 stored in the lifecycle database 120 to be displayable in the GUI 114. The application software component 106 and/or the processor 102 may further be configured to cause the lifecycle information 122 stored in the lifecycle database 120, the further lifecycle information 124 stored in the lifecycle database 120 and the further manufacturing operations information 134 stored in the manufacturing operations database 130 using the third reference information 126 stored in the lifecycle database 120 to be displayed in the GUI 114.

For all of the examples, those skilled in the art will appreciate that they may readily combine the above mentioned systems and/or methods for facilitating an error analysis of a product deficiency including at least the mentioned first reference information 136 and the mentioned third reference information 126.

The described examples may provide an efficient way for users to facilitate an error analysis of a product deficiency. Thus, the described examples may reduce the total cost of ownership of the PLM, MOM and/or QMS software component, by alleviating or at least minimizing the need for users or administrators to manually search the mentioned PLM, MOM and/or QMS information separately and try to derive sources of the occurring product deficiency. Such efficient PLM, MOM and/or QMS error analysis actions can be leveraged in any industry (e.g., Aerospace & Defense, Automotive & Transportation, Consumer Products & Retail, Electronics & Semiconductor, Energy & Utilities, Industrial Machinery & Heavy Equipment, Marine, or Medical Devices & Pharmaceuticals). Such PLM, MOM and/or QMS error analysis actions may also be applicable to consumer facing a product deficiency for which an underlying error is searched.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Figure 7:
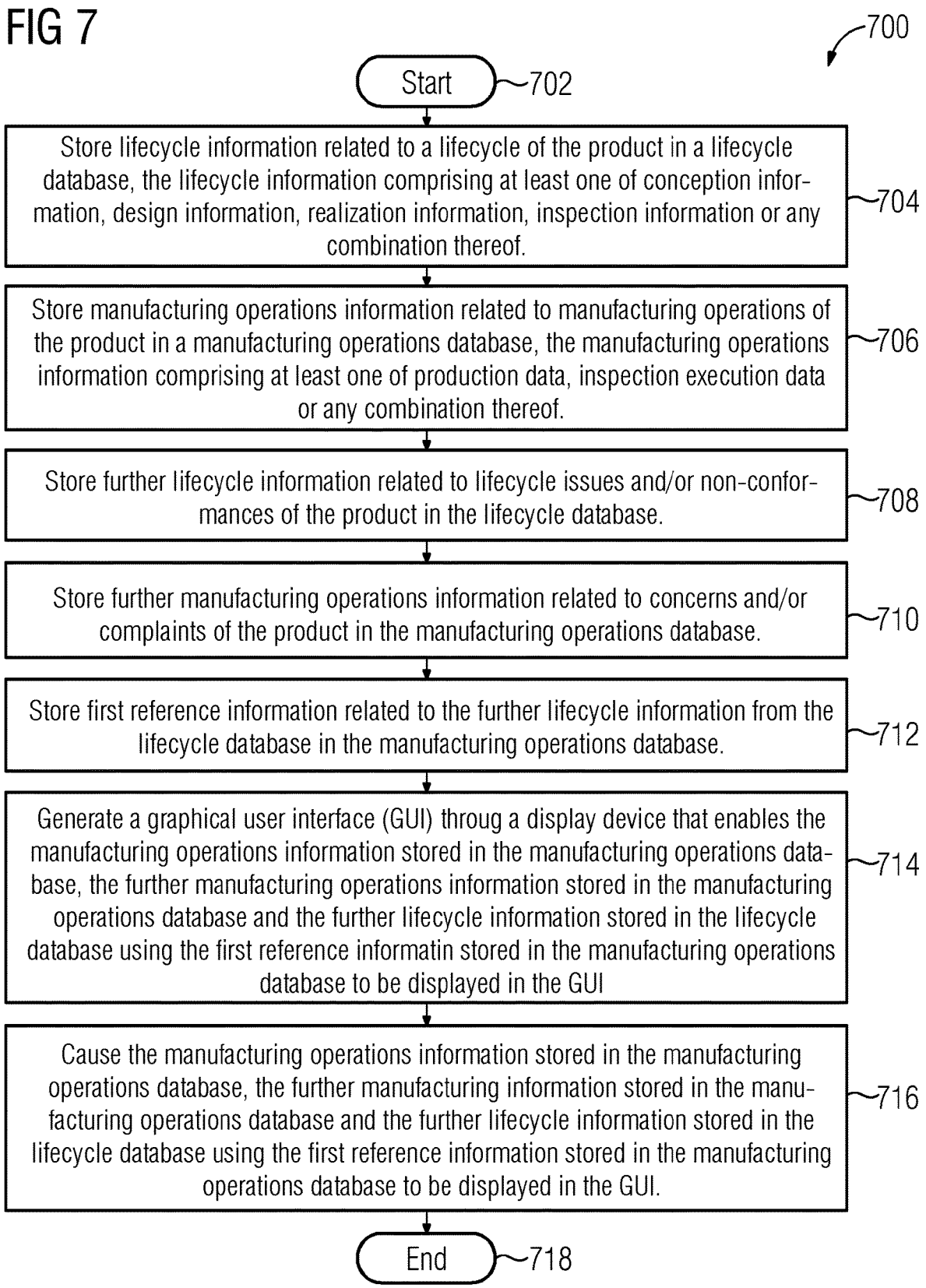
FIG. 7 illustrates a flow diagram of an example methodology that facilitates an error analysis of a product deficiency in a product system.

Referring now to FIG. 7, a methodology 700 that facilitates an error analysis of a product deficiency. The method may start at 902 and the methodology may include several acts carried out through operation of at least one processor. These acts may include an act 704 of storing lifecycle information related to a lifecycle of the product in a lifecycle database, the lifecycle information including at least one of conception information, design information, realization information, inspection planning information or any combination thereof; an act 706 of storing manufacturing operations information related to manufacturing operations of the product in a manufacturing operations database, the manufacturing operations information including at least one of production data, product validation data, inspection execution data or any combination thereof; an act 708 of storing further lifecycle information related to lifecycle issues and/or non-conformances of the product in the lifecycle database, the further lifecycle information by way of example including at least one of design issues, simulation issues, ergonomics analysis issues, dimensional analysis issues, related lifecycle issues, complaints, faults, problems or any combination thereof; an act 710 of storing further manufacturing operations information related to concerns and/or complaints of the product in the manufacturing operations database, the further manufacturing operations information by way of example including at least one of customer complaints, in-process complaints, outgoing-goods complaints, supplier complaints, related manufacturing complaints, issues, faults, problems or any combination thereof; an act 712 of storing first reference information related to the further lifecycle information from the lifecycle database in the manufacturing operations database; an act 714 of generating a GUI through a display device that enables the manufacturing operations information stored in the manufacturing operations database, the further manufacturing operations information stored in the manufacturing operations database and the further lifecycle information stored in the lifecycle database using the first reference information stored in the manufacturing operations database to be displayable in the GUI; an act 716 of causing the manufacturing operations information stored in the manufacturing operations database, the further manufacturing operations information stored in the manufacturing operations database and the further lifecycle information stored in the lifecycle database using the first reference information stored in the manufacturing operations database to be displayed in the GUI. At 724 the methodology may end.

It should be appreciated that the methodology 700 may include other acts and features discussed previously with respect to the various processing systems explained above. For example, the methodology may include acts related to the information retrieval algorithm or the error analysis algorithm explained above.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 8:
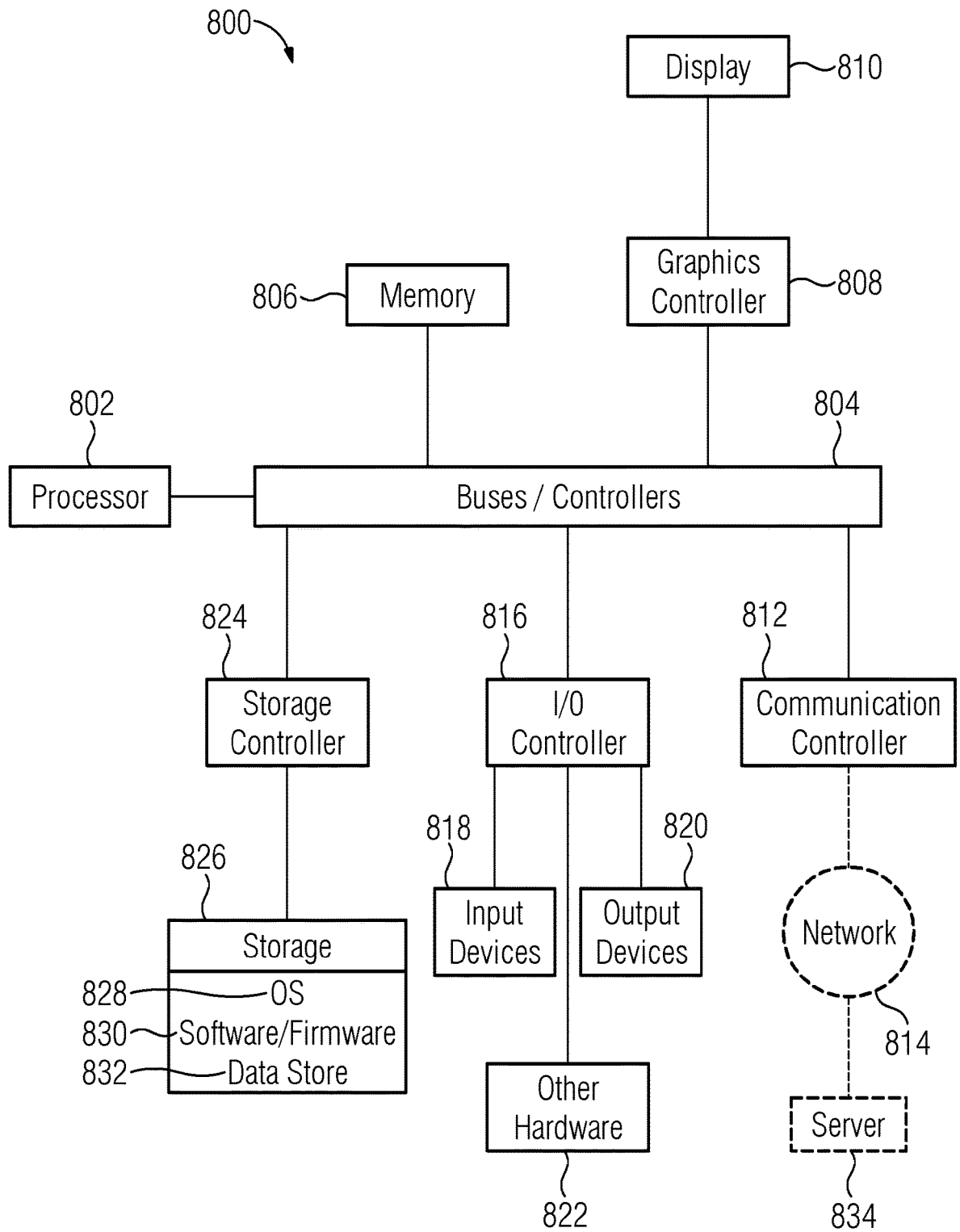
FIG. 8 illustrates a block diagram of a data processing system in which an embodiment can be implemented.

FIG. 8 illustrates a block diagram of a data processing system 800 (also referred to as a computer system) in which an embodiment can be implemented, for example, as a portion of a product system, and/or other system operatively configured by software or otherwise to perform the processes as described herein. The data processing system depicted includes at least one processor 802 (e.g., a CPU) that may be connected to one or more bridges/controllers/buses 804 (e.g., a north bridge, a south bridge). One of the buses 804, for example, may include one or more I/O buses such as a PCI Express bus. Also connected to various buses in the depicted example may include a main memory 806 (RAM) and a graphics controller 808. The graphics controller 808 may be connected to one or more display devices 810. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 812 (Ethernet controllers, WiFi controllers, cellular controllers) operative to connect to a local area network (LAN), Wide Area Network (WAN), a cellular network, and/or other wired or wireless networks 814 or communication equipment.

Further components connected to various busses may include one or more I/O controllers 816 such as USB controllers, Bluetooth controllers, and/or dedicated audio controllers (connected to speakers and/or microphones). It should also be appreciated that various peripherals may be connected to the I/O controller(s) (via various ports and connections) including input devices 818 (e.g., keyboard, mouse, pointer, touch screen, touch pad, drawing tablet, trackball, buttons, keypad, game controller, gamepad, camera, microphone, scanners, motion sensing devices that capture motion gestures), output devices 820 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 802 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 822 connected to the I/O controllers 816 may include any type of device, machine, or component that is configured to communicate with a data processing system.

Additional components connected to various busses may include one or more storage controllers 824 (e.g., SATA). A storage controller may be connected to a storage device 826 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 804 such as a PCI Express bus.

A data processing system in accordance with an embodiment of the present disclosure may include an operating system 828, software/firmware 830, and data stores 832 (that may be stored on a storage device 826 and/or the memory 806). Such an operating system may employ a command line interface (CLI) shell and/or a GUI shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 812 may be connected to the network 814 (not a part of data processing system 800), which can be any public or private data processing system network or combination of networks, as known to those of skill in the art, including the Internet. Data processing system 800 can communicate over the network 814 with one or more other data processing systems such as a server 834 (also not part of the data processing system 800). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 802 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 800 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 800 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act may be termed a second element, function, or act, and, similarly, a second element, function, or act may be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system for facilitating an error analysis of a product deficiency comprising:
    a display device; and
    at least one processor configured to:
        store lifecycle information in a lifecycle database, the lifecycle information related to a lifecycle of a digital part of a product, wherein the lifecycle information comprises at least one of conception information, design information, realization information, inspection planning information, or any combination thereof;
        store manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;
        store further lifecycle information related to lifecycle issues and/or non-conformances of the product in the lifecycle database;
        store further manufacturing operations information related to concerns and/or complaints of the product in the manufacturing operations database;
        store first reference information related to the further lifecycle information from the lifecycle database in the manufacturing operations database;
        display, by the display device, the manufacturing operations information stored in the manufacturing operations database, the further manufacturing operations information stored in the manufacturing operations database, and the further lifecycle information stored in the lifecycle database using the first reference information stored in the manufacturing operations database in a graphical user interface (GUI), therein providing a centralized approach in a single display location that allows users of both the lifecycle database and the manufacturing operations database to conduct an error analysis of an origin of the product deficiency;
        determine error information related to the product deficiency comprising a root cause analysis for both the digital part and the physical part of the product to identify the origin of the product deficiency;
        provide a table linking at least one predefined error pattern to action information relating to at least one error reduction action, the at least one error reduction action reducing or avoiding the product deficiency related to the determined error information;
        assign the determined error information to one of the at least one predefined error pattern;
        determine action information using the table and the assigned at least one predefined error pattern; and
        display, by the display device, the determined error information and the determined action information in the GUI.

2. The system according to claim 1, wherein the first reference information comprises at least a link from the manufacturing operations database to the further lifecycle information stored in the lifecycle database.

3. The system according to claim 1, wherein the at least one processor is further configured to:
    receive at least one first input through an input device, the at least one first input corresponding to a query related to the manufacturing operations information, to the further manufacturing operations information and to the further lifecycle information;
    input the manufacturing operations information stored in the manufacturing operations database, the further manufacturing operations information stored in the manufacturing operations database, and the further lifecycle information stored in the lifecycle database using the first reference information stored in the manufacturing operations database to an information retrieval algorithm;

determine information relevant to the query using the information retrieval algorithm; and display, by the display device, the determined information relevant to the query in the GUI.

4. The system according to claim 3, wherein the at least one processor is further configured to:

store the determined information relevant to the query in the manufacturing operations database.

5. The system according to claim 1, wherein the at least one processor is further configured to:

input the manufacturing operations information stored in the manufacturing operations database, the further manufacturing operations information stored in the manufacturing operations database, and the further lifecycle information stored in the lifecycle database using the first reference information stored in the manufacturing operations database.

6. The system according to claim 5, wherein the at least one processor is further configured to:

store the determined error information related to the product deficiency in the manufacturing operations database.

7. The system according to claim 6, wherein the at least one processor is further configured to:

store second reference information related to the determined error information from the manufacturing operations database in the lifecycle database.

8. The system according to claim 7, wherein the second reference information comprises at least a link from the lifecycle database to the determined error information stored in the manufacturing operations database.

9. The system according to claim 1, wherein the determined error information comprises an inconsistency between different variants of the product.

10. The system according to claim 1, wherein the determined error information comprises an inconsistency between different revisions of a product design of the product.

11. The system according to claim 1, wherein the product deficiency comprises a product fault, a product problem, a fault in a manufacturing process of the product, a problem in the manufacturing process of the product, or any combination thereof.

12. The system according to claim 1, wherein the at least one processor is further configured to:

store the determined action information in the manufacturing operations database; and amend manufacturing operations according to the determined action information.

13. The system according to claim 1, wherein the root cause analysis comprises an evaluation of complaints of the digital part of the product and complaints of the physical part of the product.

14. A system for facilitating an error analysis of a product deficiency comprising:

a display device; and at least one processor configured to:

store lifecycle information in a lifecycle database, the lifecycle information related to a lifecycle of a digital part of a product, wherein the lifecycle information comprises at least one of conception information, design information, realization information, inspection planning information, or any combination thereof;

store manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;

store further lifecycle information related to lifecycle issues and/or non-conformances of the product in the lifecycle database;

store further manufacturing operations information related to concerns and/or complaints of the product in the manufacturing operations database;

store third reference information related to the further manufacturing operations information from the manufacturing operations database in the lifecycle database;

display, by the display device, the lifecycle information stored in the lifecycle database, the further lifecycle information stored in the lifecycle database, and the further manufacturing operations information stored in the manufacturing operations database using the third reference information stored in the lifecycle database in a graphical user interlace (GUI), therein providing a centralized approach in a single display location that allows users of both the lifecycle database and the manufacturing operations database to conduct an error analysis of an origin of the product deficiency;

determine error information related to the product deficiency comprising a root cause analysis for both the digital part and the physical part of the product to identify the origin of the product deficiency;

provide a table linking at least one predefined error pattern to action information relating to at least one error reduction action, the at least one error reduction action reducing or avoiding the product deficiency related to the determined error information;

assign the determined error information to one of the at least one predefined error pattern;

determine action information using the table and the assigned at least one predefined error pattern; and display, by the display device, the determined error information and the determined action information in the GUI.

15. A method for facilitating an error analysis of a product deficiency, the method comprising, through operation of at least one processor:

storing lifecycle information in a lifecycle database, the lifecycle information related to a lifecycle of a digital part of the product, wherein the lifecycle information comprises at least one of conception information, design information, realization information, inspection planning information, or any combination thereof;

storing manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;
storing further lifecycle information related to lifecycle issues and/or non-conformances of the product in the lifecycle database;
storing further manufacturing operations information related to concerns and/or complaints of the product in the manufacturing operations database;
storing first reference information related to the further lifecycle information from the lifecycle database in the manufacturing operations database;
displaying, by a display device, the manufacturing operations information stored in the manufacturing operations database, the further manufacturing operations information stored in the manufacturing operations database, and the further lifecycle information stored in the lifecycle database using the first reference information stored in the manufacturing operations database in a graphical user interface (GUI), therein providing a centralized approach in a single display location that allows users of both the lifecycle database and the manufacturing operations database to conduct an error analysis of an origin of the product deficiency;
determining error information related to the product deficiency comprising a root cause analysis for both the digital part and the physical part of the product to identify the origin of the product deficiency;
providing a table linking at least one predefined error pattern to action information relating to at least one error reduction action, the at least one error reduction action reducing or avoiding the product deficiency related to the determined error information;
assigning the determined error information to one of the at least one predefined error pattern;
determining action information using the table and the assigned at least one predefined error pattern; and
displaying, by the display device, the determined error information and the determined action information in the GUI.

16. The method according to claim 15, further comprising through operation of the at least one processor:
receiving at least one first input through an input device, the at least one first input corresponding to a query related to the manufacturing operations information, to the further manufacturing operations information and to the further lifecycle information;
inputting the manufacturing operations information stored in the manufacturing operations database, the further manufacturing operations information stored in the manufacturing operations database, and the further lifecycle information stored in the lifecycle database using the first reference information stored in the manufacturing operations database to an information retrieval algorithm;
determining information relevant to the query using the information retrieval algorithm; and
displaying, by the display device, the determined information relevant to the query in the GUI.

17. The method according to claim 16, further comprising through operation of the at least one processor:
storing the determined information relevant to the query in the manufacturing operations database.

18. The method according to claim 15, further comprising through operation of the at least one processor:
storing the determined error information related to the product deficiency in the manufacturing operations database.

19. The method according to claim 18, further comprising through operation of the at least one processor:
storing second reference information related to the determined error information from the manufacturing operations database in the lifecycle database.

20. The method according to claim 19, wherein the second reference information comprises at least a link from the lifecycle database to the determined error information stored in the manufacturing operations database.

21. A method for facilitating an error analysis of a product deficiency, the method comprising, through operation of at least one processor:
storing lifecycle information in a lifecycle database, the lifecycle information related to a lifecycle of a digital part of the product, wherein the lifecycle information comprises at least one of conception information, design information, realization information, inspection planning information, or any combination thereof;
storing manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;
storing further lifecycle information related to lifecycle issues and/or non-conformances of the product in the lifecycle database;
storing further manufacturing operations information related to concerns and/or complaints of the product in the manufacturing operations database;
storing third reference information related to the further manufacturing operations information from the manufacturing operations database in the lifecycle database, wherein the third reference information comprises a link from the lifecycle database to the further manufacturing operations information stored in the manufacturing operations database;
displaying, by a display device, the lifecycle information stored in the lifecycle database, the further lifecycle information stored in the lifecycle database, and the further manufacturing operations information stored in the manufacturing operations database using the third reference information stored in the lifecycle database in a graphical user interface (GUI), therein providing a centralized approach in a single display location that allows users of both the lifecycle database and the manufacturing operations database to conduct an error analysis of an origin of the product deficiency;
determining error information related to the product deficiency comprising a root cause analysis for both the digital part and the physical part of the product to identify the origin of the product deficiency;
providing a table linking at least one predefined error pattern to action information relating to at least one error reduction action, the at least one error reduction action reducing or avoiding the product deficiency related to the determined error information;
assigning the determined error information to one of the at least one predefined error pattern;
determining action information using the table and the assigned at least one predefined error pattern; and displaying, by the display device, the determined error information and the determined action information in the GUI.

22. A non-transitory computer readable medium encoded with executable instructions that when executed, cause at least one processor to:
- store lifecycle information in a lifecycle database, the lifecycle information related to a lifecycle of a digital part of a product, wherein the lifecycle information comprises at least one of conception information, design information, realization information, inspection planning information, or any combination thereof;
- store manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;
- store further lifecycle information related to lifecycle issues and/or non-conformances of the product in the lifecycle database;
- store further manufacturing operations information related to concerns and/or complaints of the product in the manufacturing operations database;
- store first reference information related to the further lifecycle information from the lifecycle database in the manufacturing operations database, wherein the first reference information comprises at least a link from the manufacturing operations database to the further lifecycle information stored in the lifecycle database;
- display, by a display device, the manufacturing operations information stored in the manufacturing operations database, the further manufacturing operations information stored in the manufacturing operations database, and the further lifecycle information stored in the lifecycle database using the first reference information stored in the manufacturing operations database in a graphical user interface (GUI), therein providing a centralized approach in a single display location that allows users of both the lifecycle database and the manufacturing operations database to conduct an error analysis of an origin of a product deficiency;
- determine error information related to the product deficiency comprising a root cause analysis for both the digital part and the physical part of the product to identify the origin of the product deficiency;
- provide a table linking at least one predefined error pattern to action information relating to at least one error reduction action, the at least one error reduction action reducing or avoiding the product deficiency related to the determined error information;
- assign the determined error information to one of the at least one predefined error pattern;
- determine action information using the table and the assigned at least one predefined error pattern; and
- display, by the display device, the determined error information and the determined action information in the GUI.

23. A non-transitory computer readable medium encoded with executable instructions that when executed, cause at least one processor to:
- store lifecycle information in a lifecycle database, the lifecycle information related to a lifecycle of a digital part of a product, wherein the lifecycle information comprises at least one of conception information, design information, realization information, inspection planning information, or any combination thereof;
- store manufacturing operations information in a manufacturing operations database, the manufacturing operations information related to manufacturing operations of a physical part of the product, wherein the physical part is a same part as the digital part of the product, wherein the manufacturing operations information comprises at least one of production data, product validation data, inspection execution data, or any combination thereof;
- store further lifecycle information related to lifecycle issues and/or non-conformances of the product in the lifecycle database;
- store further manufacturing operations information related to concerns and/or complaints of the product in the manufacturing operations database;
- store third reference information related to the further manufacturing operations information from the manufacturing operations database in the lifecycle database;
- display, by a display device, the lifecycle information stored in the lifecycle database, the further lifecycle information stored in the lifecycle database, and the further manufacturing operations information stored in the manufacturing operations database using the third reference information stored in the lifecycle database in a graphical user interface (GUI), therein providing a centralized approach in a single display location that allows users of both the lifecycle database and the manufacturing operations database to conduct an error analysis of an origin of a product deficiency;
- determine error information related to the product deficiency comprising a root cause analysis for both the digital part and the physical part of the product to identify the origin of the product deficiency;
- provide a table linking at least one predefined error pattern to action information relating to at least one error reduction action, the at least one error reduction action reducing or avoiding the product deficiency related to the determined error information;
- assign the determined error information to one of the at least one predefined error pattern;
- determine action information using the table and the assigned at least one predefined error pattern; and
- display, by the display device, the determined error information and the determined action information in the GUI.

* * * * *